United States Patent
Fairman (10) Patent No.: US 6,904,475 B1
(45) Date of Patent: Jun. 7, 2005

(54) PROGRAMMABLE FIRST-IN FIRST-OUT (FIFO) MEMORY BUFFER FOR CONCURRENT DATA STREAM HANDLING

(75) Inventor: Bruce A. Fairman, Woodside, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 485 days.

(21) Appl. No.: 09/708,114

(22) Filed: Nov. 6, 2000

(51) Int. Cl.$^7$ ................................................ G06F 3/00

(52) U.S. Cl. ........................................ 710/52; 710/54

(58) Field of Search .............................. 710/4, 33, 22, 710/129, 58, 61

(56) References Cited

U.S. PATENT DOCUMENTS

| | | | |
|---|---|---|---|
| 3,836,722 A | 9/1974 | Muller et al. | 179/15 BS |
| 3,906,484 A | 9/1975 | Melvin, Jr. et al. | 340/347 DD |
| 4,218,756 A | 8/1980 | Fraser | 364/900 |
| 4,379,294 A | 4/1983 | Sutherland et al. | 340/825.5 |
| 4,395,710 A | 7/1983 | Einolf, Jr. et al. | 340/825.5 |
| 4,409,656 A | 10/1983 | Andersen et al. | 364/200 |
| 4,493,021 A | 1/1985 | Agrawal et al. | 364/200 |
| 4,633,392 A | 12/1986 | Vincent et al. | 364/200 |
| 4,641,238 A | 2/1987 | Kneib | 364/200 |
| 4,641,307 A | 2/1987 | Russell | 370/60 |
| 4,739,323 A | 4/1988 | Miesterfeld et al. | 340/825.5 |
| 4,750,149 A * | 6/1988 | Miller | 710/71 |
| 4,897,783 A | 1/1990 | Nay | 364/200 |
| 4,972,470 A | 11/1990 | Farago | 380/3 |
| 4,998,245 A | 3/1991 | Tanaka et al. | 370/85.1 |
| 5,008,879 A | 4/1991 | Fischer et al. | 370/85.2 |
| 5,117,070 A | 5/1992 | Ueno et al. | 178/2 R |
| 5,191,418 A | 3/1993 | Tran | 358/142 |

(Continued)

FOREIGN PATENT DOCUMENTS

| | | | |
|---|---|---|---|
| EP | 0 428 111 A2 | 5/1991 | G06F/13/28 |
| EP | 0 499 394 A1 | 8/1992 | G06F/13/38 |
| EP | 0 588 046 A1 | 3/1994 | G06F/13/38 |
| EP | 0 696 853 A2 | 2/1996 | H04B/1/20 |

OTHER PUBLICATIONS

"The Parallel Protocol Engine" Matthias Kaiserswerth, IEEE/ACM Transactions on Networking, No. 6, Dec. 1993, New York, pp. 650–663.

(Continued)

*Primary Examiner*—Kim Huynh
(74) *Attorney, Agent, or Firm*—Haverstock & Owens LLP (57) ABSTRACT

A programmable FIFO receives a stream of data to be buffered within the FIFO and then output from the FIFO. The programmable FIFO includes the ability to receive program instructions from an application or control circuit to perform specific operations on the stream of data before the data is provided as an output from the programmable FIFO. By performing the specific operations of the program instructions, the programmable FIFO has the ability to filter the stream of data as it passes through the FIFO, including reordering data within the FIFO, if appropriate, and also to synchronize the input and output of the stream of data with external input and output signals, respectively. The programmable FIFO also has the ability to operate as a typical FIFO and buffer the data without manipulating it. The programmable FIFO includes a programmable element and a FIFO memory and control circuit. The stream of data is stored within the FIFO memory and control circuit and then output in the appropriate order, depending on the program instructions. The programmable element includes a program memory in which the program instructions are stored and an execution unit which executes and performs the specific operations on the stream of data. Preferably, the programmable FIFO is implemented within a device configured for coupling to an IEEE 1394-2000 serial bus network. Alternatively, the programmable FIFO is implemented as a separate dedicated device within the IEEE 1394-2000 serial bus network.

46 Claims, 7 Drawing Sheets

U.S. PATENT DOCUMENTS

| | | | |
|---|---|---|---|
| 5,276,684 A | 1/1994 | Pearson | 370/94.1 |
| 5,325,510 A | 6/1994 | Frazier | 395/425 |
| 5,343,469 A | 8/1994 | Ohshima | 370/85.1 |
| 5,359,713 A | 10/1994 | Moran et al. | 395/200 |
| 5,361,261 A | 11/1994 | Edem et al. | 370/85.3 |
| 5,369,773 A | 11/1994 | Hammerstrom | 395/800 |
| 5,400,340 A | 3/1995 | Hillman et al. | 370/105.3 |
| 5,402,419 A | 3/1995 | Osakabe et al. | 370/85.1 |
| 5,412,698 A | 5/1995 | Van Brunt et al. | 375/373 |
| 5,420,573 A | 5/1995 | Tanaka et al. | 340/825.24 |
| 5,444,709 A | 8/1995 | Riddle | 370/94.1 |
| 5,465,402 A | 11/1995 | Ono et al. | 455/161.2 |
| 5,487,153 A | 1/1996 | Hammerstrom et al. | 395/250 |
| 5,493,570 A | 2/1996 | Hillman et al. | 370/105.3 |
| 5,497,466 A | 3/1996 | Roden et al. | 395/306 |
| 5,499,344 A * | 3/1996 | Elnashar et al. | 710/310 |
| 5,500,946 A | 3/1996 | Roden et al. | 395/308 |
| 5,506,846 A | 4/1996 | Edem et al. | 370/94.2 |
| 5,509,126 A | 4/1996 | Oprescu et al. | 395/307 |
| 5,515,329 A * | 5/1996 | Dalton et al. | 365/221 |
| 5,519,701 A | 5/1996 | Colmant et al. | 370/60.1 |
| 5,524,213 A | 6/1996 | Dais et al. | 395/200.17 |
| 5,526,353 A | 6/1996 | Henley et al. | 370/60.1 |
| 5,533,018 A | 7/1996 | DeJager et al. | 370/60.1 |
| 5,535,208 A | 7/1996 | Kawakami et al. | 370/84 |
| 5,537,408 A | 7/1996 | Branstad et al. | 370/79 |
| 5,537,601 A * | 7/1996 | Kimura et al. | 712/35 |
| 5,544,324 A | 8/1996 | Edem et al. | 395/200.17 |
| 5,546,389 A | 8/1996 | Wippenbeck et al. | 370/60 |
| 5,546,553 A | 8/1996 | Robertson et al. | 395/405 |
| 5,548,587 A | 8/1996 | Bailey et al. | 370/60.1 |
| 5,550,802 A | 8/1996 | Worsley et al. | 370/13 |
| 5,559,796 A | 9/1996 | Edem et al. | 370/60 |
| 5,559,967 A | 9/1996 | Oprescu et al. | 395/285 |
| 5,566,174 A | 10/1996 | Sato et al. | 370/84 |
| 5,576,980 A | 11/1996 | Whetsel | 364/579 |
| 5,579,278 A | 11/1996 | McLuary | 365/230.05 |
| 5,586,264 A | 12/1996 | Belknap et al. | 395/200.08 |
| 5,594,732 A | 1/1997 | Bell et al. | 370/401 |
| 5,594,734 A | 1/1997 | Worsley et al. | 370/395 |
| 5,598,545 A | 1/1997 | Childers et al. | 395/562 |
| 5,602,853 A | 2/1997 | Ben-Michael et al. | 370/474 |
| 5,603,058 A | 2/1997 | Belknap et al. | 395/855 |
| 5,615,382 A | 3/1997 | Gavin et al. | 395/800 |
| 5,617,419 A | 4/1997 | Christensen et al. | 370/471 |
| 5,619,646 A | 4/1997 | Hoch et al. | 395/200.01 |
| 5,632,016 A | 5/1997 | Hoch et al. | 395/200.02 |
| 5,640,286 A | 6/1997 | Acosta et al. | 360/48 |
| 5,640,392 A | 6/1997 | Hayashi | 370/395 |
| 5,640,592 A | 6/1997 | Rao | 395/825 |
| 5,646,941 A | 7/1997 | Nishimura et al. | 370/389 |
| 5,647,057 A | 7/1997 | Roden et al. | 395/275 |
| 5,652,584 A | 7/1997 | Yoon | 341/89 |
| 5,655,138 A | 8/1997 | Kikinis | 395/808 |
| 5,659,780 A | 8/1997 | Wu | 395/800.19 |
| 5,661,848 A | 8/1997 | Bonke et al. | 395/439 |
| 5,664,124 A | 9/1997 | Katz et al. | 395/309 |
| 5,668,948 A | 9/1997 | Belknap et al. | 395/200.61 |
| 5,682,493 A | 10/1997 | Yung et al. | 395/393 |
| 5,684,954 A | 11/1997 | Kaiserswerth et al. | 395/200.2 |
| 5,687,174 A | 11/1997 | Edem et al. | 370/446 |
| 5,687,316 A | 11/1997 | Graziano et al. | 395/200.2 |
| 5,689,244 A | 11/1997 | Iijima et al. | 340/825.07 |
| 5,689,727 A | 11/1997 | Bonke et al. | 395/840 |
| 5,692,211 A | 11/1997 | Gulick et al. | 395/800 |
| 5,694,555 A | 12/1997 | Morriss et al. | 395/280 |
| 5,696,924 A | 12/1997 | Robertson et al. | 395/412 |
| 5,701,302 A | 12/1997 | Geiger | 370/521 |
| 5,704,052 A | 12/1997 | Wu et al. | 395/380 |
| 5,706,439 A | 1/1998 | Parker | 395/200.17 |
| 5,708,779 A | 1/1998 | Graziano et al. | 395/200.8 |
| 5,710,773 A | 1/1998 | Shiga | 370/512 |
| 5,726,821 A | 3/1998 | Cloke et al. | 360/67 |
| 5,752,076 A | 5/1998 | Munson | 395/825 |
| 5,758,075 A | 5/1998 | Graziano et al. | 395/200.8 |
| 5,761,430 A | 6/1998 | Gross et al. | 395/200.55 |
| 5,761,457 A | 6/1998 | Gulick | 395/308 |
| 5,774,683 A | 6/1998 | Gulick | 395/309 |
| 5,781,599 A | 7/1998 | Shiga | 375/376 |
| 5,787,256 A | 7/1998 | Marik et al. | 395/200.68 |
| 5,787,298 A | 7/1998 | Broedner et al. | 395/750.05 |
| 5,793,953 A | 8/1998 | Yeung et al. | 395/200.8 |
| 5,799,041 A | 8/1998 | Szkopek et al. | 375/259 |
| 5,812,883 A | 9/1998 | Rao | 395/8.94 |
| 5,815,678 A | 9/1998 | Hoffman et al. | 395/309 |
| 5,828,416 A | 10/1998 | Ryan | 348/512 |
| 5,828,903 A | 10/1998 | Sethuram et al. | 395/817 |
| 5,832,245 A | 11/1998 | Gulick | 395/309 |
| 5,835,726 A | 11/1998 | Shwed et al. | 395/200.59 |
| 5,835,793 A | 11/1998 | Li et al. | 395/898 |
| 5,848,253 A | 12/1998 | Walsh et al. | 395/309 |
| 5,872,983 A | 2/1999 | Walsh et al. | 395/750.01 |
| 5,875,312 A | 2/1999 | Walsh et al. | 395/309 |
| 5,884,103 A | 3/1999 | Terho et al. | 395/892 |
| 5,887,145 A | 3/1999 | Harari et al. | 395/282 |
| 5,938,752 A | 8/1999 | Leung et al. | 710/126 |
| 5,946,298 A | 8/1999 | Okuyama | 370/232 |
| 5,948,053 A * | 9/1999 | Kamiya | 708/522 |
| 5,970,236 A | 10/1999 | Galloway et al. | 395/500 |
| 5,987,126 A | 11/1999 | Okuyama et al. | 380/5 |
| 5,991,520 A | 11/1999 | Smyers et al. | 395/280 |
| 6,029,221 A * | 2/2000 | Wu et al. | 710/305 |
| 6,085,270 A | 7/2000 | Gulick | 710/100 |
| 6,145,016 A * | 11/2000 | Lai et al. | 710/4 |
| 6,205,538 B1 | 3/2001 | Yung | 712/201 |
| 6,226,338 B1 * | 5/2001 | Earnest | 375/372 |
| 6,233,637 B1 | 5/2001 | Smyers et al. | 710/129 |
| 6,243,783 B1 | 6/2001 | Smyers et al. | 710/129 |
| 6,266,727 B1 | 7/2001 | Smyers et al. | 710/105 |
| 6,516,371 B1 * | 2/2003 | Lai et al. | 710/129 |
| 6,519,268 B1 | 2/2003 | Smyers | 370/536 |
| 6,587,910 B2 | 7/2003 | Smyers et al. | 710/306 |
| 6,631,435 B1 | 10/2003 | Lym et al. | 710/305 |
| 6,732,223 B1 * | 5/2004 | Johnson | 711/105 |

OTHER PUBLICATIONS

"The Programmable Protocol VLSI Engine (PROVE)" A.S. Krishnakumar, W.C. Fischer, and Krishan Sabnani, 8089 IEEE Transactions on Communications, No. 8, Aug. 1994, New York, pp. 2630–2642.

"A Bus on a Diet–The Serial Bus Alternative, An Introduction to the P1394 High Performance Serial Bus," Michael Teener, Apple Computer Inc., Santa Clara, USA Feb. 24, 1992, pp. 316–321.

"Local Area Network Protocol for Autonomous Control of Attached Devices," Software Patent Institute, Jul., 1990.

"Architecture for High Performance Transparent Bridges," Software Patent Institute, Jul., 1992.

"Access to High–Speed LAN via Wireless Media," Software Patent Institute, Database of Software Technologies, Apr., 1993.

"Asynchronous Transfer Mode," Julia L. Heeter, IFSM 651 and 652, Dec. 12, 1995.

"The SerialSoft IEEE 1394 Developer Toolkit," Skiptone, Application API And Implementation Examples.

"Data Link Driver Program Design for the IBM Token Ring Network PC Adaptor," Gee–Swee Poo and Wilson Ang, Computer Communication, No. 5, Oct. 1989, London, Great Britain, pp. 266–272.

"Fiber Channel (FCS) ATM Interworking: A Design Solution," A. Anzaloni, M. De Sanctis, F. Avaltroni, G. Rulli, L. Proietti and G. Lombardi, Ericsson Fatme R&D Division, Nov. 29, 1993, pp. 1127–1133.

"Data Exchange Adapter for Micro Channel/370," Software Patent Institute, Oct. 1991.

IEEE, "1394 Standard for High Performance Serial Bus," 1995, USA.

"1394 200 Mb/s PHYsical Layer Transceiver, Product Data Sheet and Application Notes," IBM Microelectronics, Version 1.4, Mar. 14, 1996.

"TSB21LV03 IEEE 1394–1995 Triple Cable Transceiver/Arbiter," Texas Instruments, Product Preview, Revision 0.99, Mar. 19, 1996.

"The IEEE–1394 High Speed Serial Bus," R.H.J. Bloks, Philips Journal of Research, vol. 50, No. 1/2, 1996.

"PC 4 intern Systemprogrammierung," Michael Tisher, pp. 162–181, Data Becker GmbH, 1994, Dusseldorf, Germany.

"IEEE 1394, The Cable Connection To Complete The Digital Revolution," Daniel Moore.

"P1394a Draft Standard for High Performance Serial Bus (Supplement)" P1394a Draft 2.0, Mar. 15, 1998, p. 1–166.

* cited by examiner

FIFO Contents

*Fig. 7*

PROGRAMMABLE FIRST-IN FIRST-OUT (FIFO) MEMORY BUFFER FOR CONCURRENT DATA STREAM HANDLING

FIELD OF THE INVENTION:

The present invention relates to the field of receiving, storing and transmitting data. More particularly, the present invention relates to the field of managing and manipulating buffered data.

BACKGROUND OF THE INVENTION

The IEEE standard, "IEEE 1394-2000 Standard For A High Performance Serial Bus," Draft ratified in 2000, is an international standard for implementing an inexpensive high-speed serial bus architecture which supports both asynchronous and isochronous format data transfers. Isochronous data transfers are real-time transfers which take place such that the time intervals between significant instances have the same duration at both the transmitting and receiving applications. Each packet of data transferred isochronously is transferred in its own time period. The IEEE 1394-2000 standard bus architecture provides up to sixty-four (64) channels for isochronous data transfer between applications. A six bit channel number is broadcast with the data to ensure reception by the appropriate application. This allows multiple applications to simultaneously transmit isochronous data across the bus structure. Asynchronous transfers are traditional data transfer operations which take place as soon as possible and transfer an amount of data from a source to a destination.

The IEEE 1394-2000 standard provides a high-speed serial bus for interconnecting digital devices thereby providing a universal I/O connection. The IEEE 1394-2000 standard defines a digital interface for the applications thereby eliminating the need for an application to convert digital data to analog data before it is transmitted across the bus. Correspondingly, a receiving application will receive digital data from the bus, not analog data, and will therefore not be required to convert analog data to digital data. The cable required by the IEEE 1394-2000 standard is very thin in size compared to other bulkier cables used to connect such devices. Devices can be added and removed from an IEEE 1394-2000 bus while the bus is active. If a device is so added or removed the bus will then automatically reconfigure itself for transmitting data between the then existing nodes. A node is considered a logical entity with a unique identification number on the bus structure. Each node provides an identification ROM, a standardized set of control registers and its own address space.

Figure 1:
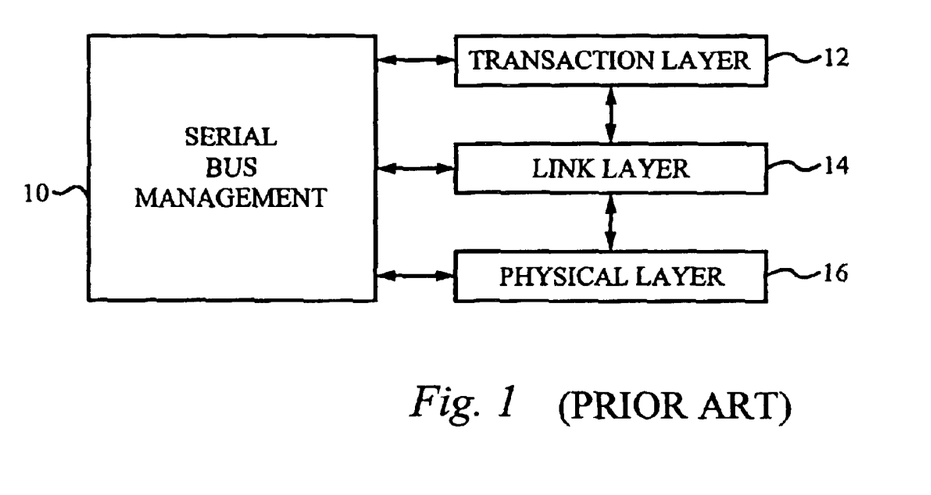
FIG. 1 illustrates a protocol of the IEEE 1394-2000 standard.

The IEEE 1394-2000 standard defines a protocol as illustrated in FIG. 1. This protocol includes a serial bus management block 10 coupled to a transaction layer 12, a link layer 14 and a physical layer 16. The physical layer 16 provides the electrical and mechanical connection between a device or application and the IEEE 1394-2000 cable. The physical layer 16 also provides arbitration to ensure that all devices coupled to the IEEE 1394-2000 bus have access to the bus as well as actual data transmission and reception. The link layer 14 provides data packet delivery service for both asynchronous and isochronous data packet transport. This supports both asynchronous data transport, using an acknowledgement protocol, and isochronous data transport, providing real-time guaranteed bandwidth protocol for just-in-time data delivery. The transaction layer 12 supports the commands necessary to complete asynchronous data transfers, including read, write and lock. The serial bus management block 10 contains an isochronous resource manager for managing isochronous data transfers. The serial bus management block 10 also provides overall configuration control of the serial bus in the form of optimizing arbitration timing, guarantee of adequate electrical power for all devices on the bus, assignment of the cycle master, assignment of isochronous channel and bandwidth resources and basic notification of errors.

As discussed above, an IEEE 1394-2000 device includes the capability to transmit and receive data. This data can be of many different formats. Often data received by an IEEE 1394-2000 device must be processed. This processing includes any or all of displaying, manipulating, forwarding and storing. This processing can be performed in software controlled by the receiving application or in hardware. An example of an isochronous data pipe apparatus for processing received isochronous data, is taught within U.S. patent application Ser. No. 08/612,322, filed on Mar. 7, 1996 and entitled "ISOCHRONOUS DATA PIPE FOR MANAGING AND MANIPULATING A HIGH-SPEED STREAM OF ISOCHRONOUS DATA FLOWING BETWEEN AN APPLICATION AND A BUS STRUCTURE," which is hereby incorporated by reference.

First-in first-out (FIFO) buffers or memories are typically used as intermediate buffers during a data transfer where a buffer is needed and the order of the data, as received, must be maintained. FEFO's are generally implemented within a random access memory structure. A write pointer is used to keep track of the available memory locations. A read pointer is used to keep track of the occupied memory locations. As data is written to and read from the FIFO buffer, the write and read pointers are incremented, respectively, in order to maintain the order of the data so that the data is output from the FIFO buffer in the same order that it was received. Typically, a FIFO only includes the ability to buffer the data by receiving the data, storing the data, and then providing the data at an output in the same order that the data was received.

SUMMARY OF THE INVENTION

A programmable FIFO receives a stream of data to be buffered within the FIFO and then output from the FIFO. The programmable FIFO includes the ability to receive program instructions from an application or control circuit to perform specific operations on the stream of data before the data is provided as an output from the programmable FIFO. By performing the specific operations of the program instructions, the programmable FIFO has the ability to filter the stream of data as it passes through the FIFO, including re-ordering data within the FIFO, if appropriate, and also to synchronize the input and output of the stream of data with external input and output signals, respectively. The programmable FIFO also has the ability to operate as a typical FIFO and buffer the data without manipulating it. The programmable FIFO includes a programmable element and a FIFO memory and control circuit. The stream of data is stored within the FIFO memory and control circuit and then output in the appropriate order, depending on the program instructions. The programmable element includes a program memory in which the program instructions are stored and an execution unit which executes and performs the specific operations on the stream of data. Preferably, the programmable FIFO is implemented within a device configured for coupling to an IEEE 1394-2000 serial bus network. Alternatively, the programmable FIFO is implemented as a separate dedicated device within the IEEE 1394-2000 serial bus network.

In one aspect of the present invention, a method of buffering data within a first-in first-out buffer comprises receiving a stream of data to be buffered within the first-in first-out buffer, storing the stream of data within the first-in first-out buffer thereby forming a stored stream of data, obtaining a series of program instructions specifying operations to be performed on the stored stream of data and generating an output stream of data by executing the series of program instructions and performing the operations on the stored stream of data. The program instructions are obtained from an application or a control circuit. The stream of data is received from a bus structure. The bus structure is preferably an IEEE 1394 bus structure. The method further comprises transmitting the output stream of data from a buffer interface. Generating an output stream includes synchronizing the output stream of data to a time reference. A time reference is the cycle time of an IEEE 1394 bus structure.

In another aspect of the present invention, a method of buffering data within a first-in first-out buffer comprises receiving a stream of data to be buffered within the first-in first-out buffer, storing the stream of data within the first-in first-out buffer thereby forming a stored stream of data, obtaining a series of program instructions specifying operations to be performed in relation to the stored stream of data and generating an output stream of data by executing the series of program instructions and performing the operations in relation to the stored stream of data, including synchronizing the output stream of data to a time reference. The program instructions are obtained from an application or a control circuit. The stream of data is received from a bus structure. The bus structure is preferably an IEEE 1394 bus structure. The method further comprises transmitting the output stream of data from a buffer interface. Generating an output stream of data includes manipulating the stored stream of data to form the output stream of data A time reference is the cycle time of an IEEE 1394 bus structure.

In yet another aspect of the present invention, an apparatus for buffering data within a first-in first-out buffer comprises means for receiving a stream of data to be buffered within the first-in first-out buffer, means for storing the stream of data within the first-in first-out buffer thereby forming a stored stream of data, means for obtaining a series of program instructions specifying operations to be performed on the stored stream of data and means for generating an output stream of data by executing the series of program instructions and performing the operations on the stored stream of data. The program instructions are obtained from an application or a control circuit. The means for receiving a stream of data is coupled to a bus structure to receive the stream of data. The bus structure is preferably an IEEE 1394 bus structure. The apparatus further comprises means for transmitting coupled to the means for generating for transmitting the output stream of data. The means for generating synchronizes the output stream of data to a time reference. A time reference is the cycle time of an IEEE 1394 bus structure.

In still yet another aspect of the present invention, a programmable first-in first-out buffer comprises an input interface circuit configured to receive a stream of data to be buffered within the first-in first-out buffer, a data memory coupled to the input interface circuit to store the stream of data, thereby forming a stored stream of data, a program memory configured to obtain and store a series of program instructions specifying operations to be performed on the stored stream of data and an execution unit coupled to the program memory and to the data memory to generate an output stream of data by executing the series of program instructions and perform the operations on the stored stream of data. The program instructions are obtained from an application or a control circuit. The input interface circuit is coupled to a bus structure to receive the stream of data. The bus structure is preferably an IEEE 1394 bus structure. The programmable first-in first-out buffer further comprises an output interface circuit coupled to the execution circuit and the data memory and configured to transmit the output stream of data. The execution unit synchronizes the output stream of data to a time reference. A time reference is the cycle time of an IEEE 1394 bus structure.

In yet another aspect of the present invention, a system comprises a bus interface circuit configured to couple to a bus structure and receive a stream of data, a data memory coupled to the bus interface circuit to store the stream of data, thereby forming a stored stream of data, wherein the data memory stores and outputs the stored stream of data thereby forming an output stream of data, a program memory configured to obtain and store a series of program instructions specifying operations to be performed on the stored stream of data and an execution unit coupled to the program memory and to the data memory to generate an output stream of data by executing the series of program instructions and performing the operations on the stored stream of data. The program instructions are obtained from an application or a control circuit. The bus structure is preferably an IEEE 1394 bus structure. The system further comprises an output interface circuit coupled to the execution unit and the data memory and configured to transmit the output stream of data. The execution unit synchronizes the output stream of data to a time reference. A time reference is the cycle time of an IEEE 1394 bus structure.

In still yet another aspect of the present invention, a network of devices comprises a plurality of devices, a bus structure coupled between the plurality of devices to transmit data between the devices and a programmable first-in first-out buffer including an input interface circuit configured to receive a stream of data to be buffered within the first-in first-out buffer, a data memory coupled to the input interface circuit to store the stream of data, thereby forming a stored stream of data, a program memory configured to obtain and store a series of program instructions specifying operations to be performed on the stored stream of data and an execution unit coupled to the program memory and to the data memory to generate an output stream of data by executing the series of program instructions and perform the operations on the stored stream of data. The program instructions are obtained from an application or a control circuit. The bus structure is preferably an IEEE 1394 bus structure. The network of devices further comprises an output interface circuit coupled to the execution unit and the data memory and configured to transmit the output stream of data. The execution unit synchronizes the output stream of data to a time reference. A time reference is the cycle time of an IEEE 1394 bus structure.

DETAILED DESCRIPTION OF THE PREFERRED EMBODIMENT

A programmable FIFO according to the present invention buffers a stream of data such that the data is filtered and output in an order, as determined by program instructions. Preferably, the programmable FIFO is included within a device coupled in an IEEE 1394-2000 serial bus network with other devices. Alternatively, the programmable FIFO is implemented within a separate component coupled within the IEEE 1394-2000 serial bus network. The programmable FIFO includes the ability to receive program instructions to perform specific operations on the stream of data while the stream of data is stored within the programmable FIFO. The program instructions are received from an application or control circuit. An application as used herein will refer to either an application or a device driver.

The programmable FIFO includes a programmable element and a FIFO memory and control circuit. The stream of data is stored within the FIFO memory and control circuit. The programmable element includes a program memory in which the program instructions are stored. The programmable element also includes an execution unit which executes the program instructions and performs the specific operations on the stream of data. In this manner, by performing program instructions the programmable FIFO has the ability to filter and re-order the stream of data as it passes through the FIFO. The programmable FIFO also has the ability to synchronize the input and output of the stream of data with external input and output signals, respectively.

Figure 2:
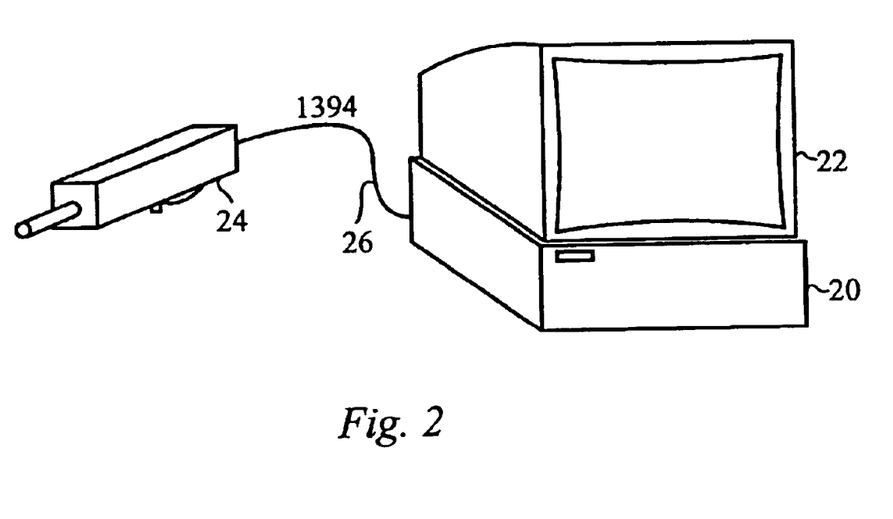
FIG. 2 illustrates an exemplary IEEE 1394-2000 serial bus network including a computer system and a video camera.

An exemplary IEEE 1394-2000 serial bus network implementing the present invention and including a computer system and a video camera is illustrated in FIG. 2. The computer system 20 includes an associated display 22 and is coupled to the video camera 24 by the IEEE 1394-2000 serial bus cable 26. Video data and associated data are sent between the video camera 24 and the computer system 20 over the IEEE 1394-2000 serial bus cable 26.

Figure 3:
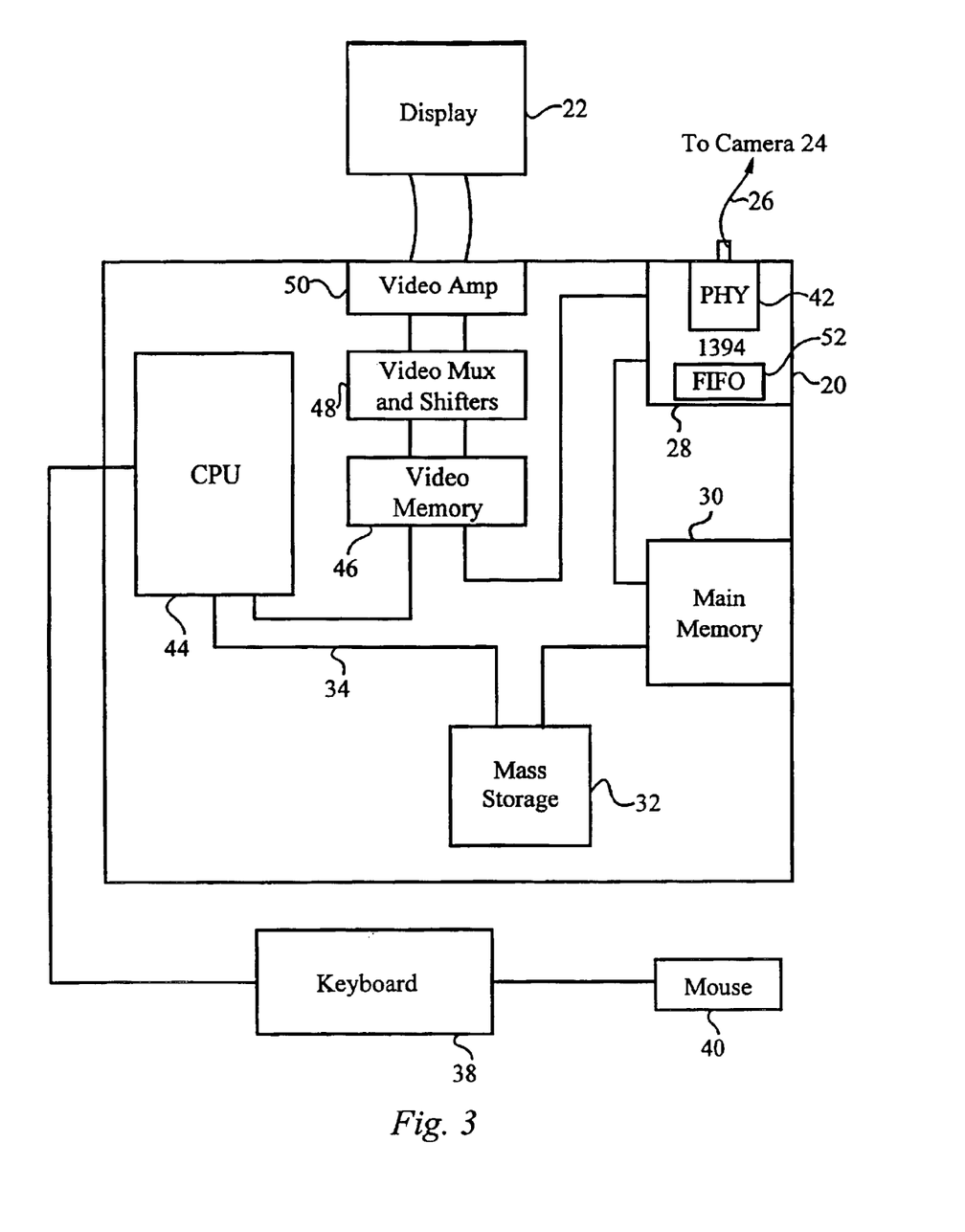
FIG. 3 illustrates a block diagram of the internal components of the computer system 20.

A block diagram of the internal components of the exemplary computer system 20 is illustrated in FIG. 3. The computer system 20 includes a central processor unit (CPU) 44, a main memory 30, a video memory 46, a mass storage device 32 and an IEEE 1394-2000 interface circuit 28, all coupled together by a conventional bidirectional system bus 34. The interface circuit 28 includes the physical interface circuit 42 for sending and receiving communications on the IEEE 1394-2000 serial bus and the programmable FIFO 52 which is used to buffer, filter and modify as necessary, streams of data received and transmitted through the physical interface circuit 42. The physical interface circuit 42 is coupled to the camera 24 over the IEEE 1394-2000 serial bus cable 26. The system bus 34 contains an address bus for addressing any portion of the memory 30 and 46. The system bus 34 also includes a data bus for transferring data between and among the CPU 44, the main memory 30, the video memory 46, the mass storage device 32 and the interface circuit 28.

The computer system 20 is also coupled to a number of peripheral input and output devices including the keyboard 38, the mouse 40 and the associated display 22. The keyboard 38 is coupled to the CPU 44 for allowing a user to input data and control commands into the computer system 20. A conventional mouse 40 is coupled to the keyboard 38 for manipulating graphic images on the display 22 as a cursor control device. As is well known in the art, the mouse 40 can alternatively be coupled directly to the computer 20 through a serial port.

A port of the video memory 46 is coupled to a video multiplex and shifter circuit 48, which in turn is coupled to a video amplifier 50. The video amplifier SO drives the display 22. The video multiplex and shifter circuitry 48 and the video amplifier 50 convert pixel data stored in the video memory 46 to raster signals suitable for use by the display 22.

Preferably, the programmable FIFO is included within a device coupled within an IEEE 1394-2000 serial bus network with other audio and video devices, such as within the computer system 20. Alternatively, the programmable FIFO is implemented within a separate component coupled within the IEEE 1394-2000 serial bus network.

Figure 4:
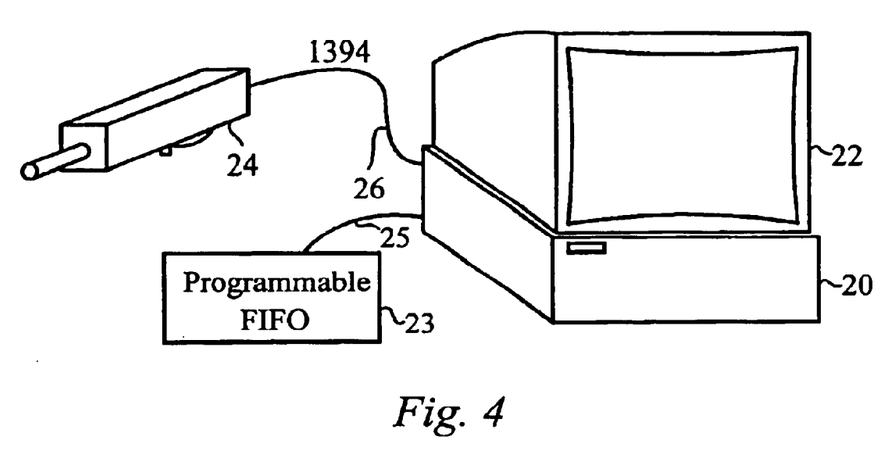
FIG. 4 illustrates an exemplary IEEE 1394-2000 serial bus network including a programmable FIFO embodied within a separate dedicated device.
Figure 5:
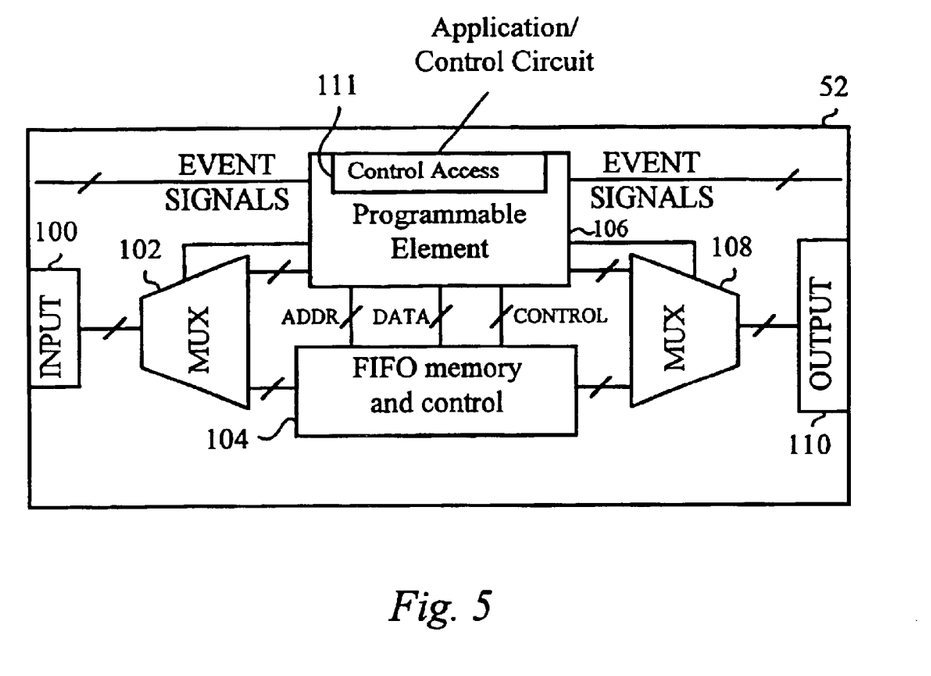
FIG. 5 illustrates a block diagram schematic of the programmable FIFO of the preferred embodiment of the present invention.

In an alternate embodiment of the present invention, as illustrated in FIG. 4, the programmable FIFO is embodied within a separate dedicated component coupled to the IEEE 1394-2000 serial bus. The programmable FIFO 23 is coupled to the computer system 20 by the IEEE 1394-2000 serial bus 25. In this embodiment, any data stream sent to the programmable FIFO 23 is received, stored, manipulated, as appropriate according to the programmed instructions, and then transmitted to the target device A block diagram schematic of the components within the programmable FIFO of the preferred embodiment of the present invention is illustrated in FIG. 5. The programmable FIFO 52 includes a data input interface 100 through which data is received to be stored within the FIFO 52. The data input interface 100 is coupled to a demultiplexer 102 which demultiplexes the stream of data received by the data input interface 100. The demultiplexer 102 is coupled to provide data to the FIFO memory and control circuit 104 and to the programmable element 106. The programmable element 106 is also coupled to control the demultiplexer 102. Based on the control signal from the programmable element 106, the demultiplexer 102 either directs the incoming data to the programmable element 106 or to the FIFO memory and control circuit 104. The programmable element 106 includes the control access interface 111 through which program instructions are preferably received from a controlling application or control circuit. In this manner, the programmable element 106 can receive program instructions and control signals from a means external to the programmable FIFO 52 and the FIFO memory and control circuit 104 is loaded with data that is to be buffered by the programmable FIFO 52. The programmable element 106 is also coupled to receive and transmit event and control signals to applications or control circuits external to the programmable FIFO 52.

The programmable element 106 includes an address bus, a data bus and a control bus which are coupled to the FIFO memory and control circuit 104 and are used to address, examine and manipulate the data within the FIFO memory and control circuit 104. An output of the FIFO memory and control circuit 104 is coupled as an input to a multiplexer 108. An output of the programmable element 106 is also coupled as an input to the multiplexer 108. The programmable element 106 is also coupled to control the multiplexer 108. The multiplexer 108 multiplexes the data from the programmable element 106 and from the FIFO memory and control circuit 104 and provides the multiplexed output stream to an output data interface 110. The output data interface 110 then provides the multiplexed output stream from the multiplexer 108 as the output of the programmable FIFO 52.

The inclusion of the programmable element 106 within the programmable FIFO 52 provides a mechanism that has the properties of a FIFO, with the additional capability to adapt the behavior of the FIFO based on external knowledge of the format of the data stream flowing through the FIFO. The programmable element 106 is capable of being programmed by means external to the programmable FIFO 52, such as an application or control circuit, preferably through the control access interface 111. In the exemplary computer system of FIG. 3, the programmable element 106 could alternatively be programmed by the CPU 44. Once programmed, the programmable element 106 then has the capability to monitor the input to the FIFO, generate the output of the FIFO and signal synchronization events at both the input and the output of the programmable FIFO 52. Preferably, the data width of the data paths and storage of the programmable element 106 are compatible with the data width of the FIFO memory and control circuit 104, by either being as wide as the data width of the FIFO memory and control circuit 104 or by being a sub-multiple of the data width of the FIFO memory and control circuit 104. Alternatively, the data paths and storage of the programmable element 106 have any appropriate data width.

Figure 6:
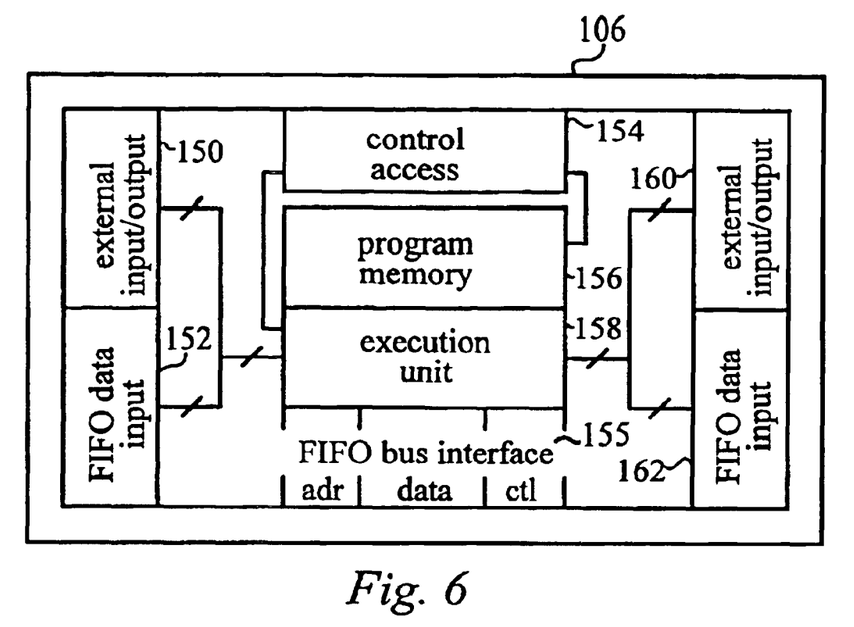
FIG. 6 illustrates a block diagram schematic of the programmable element within the FIFO of the preferred embodiment of the present invention.

A block diagram schematic of the components within the programmable element 106 of the preferred embodiment of the present invention is illustrated in FIG. 6. The programmable element 106 includes a FIFO data input 152 and an external input/output interface 150. The FIFO data input 152 is coupled to the output of the demultiplexer 102 to receive the data 49 input to the demultiplexer 102, as appropriate. The external input/output interface 150 is coupled to receive and transmit event and control signals from and to applications or control circuits external to the programmable FIFO 52. Both the FIFO data input 152 and the external input/output interface 150 are coupled to an execution unit 158, which includes a FIFO bus interface 155 through which the programmable element 106 receives and transmits data from and to the FIFO memory and control circuit 104 on the address and data buses. The FIFO bus interface 155 also includes the control signal lines which are coupled to control the demultiplexer 102 and the multiplexer 108. The execution unit 158 includes a program memory 156 which is used to store the instructions and commands to be performed on the data stored within the FIFO memory and control circuit 104. The execution unit 158 performs the instructions and commands stored in the program memory 156 on the data stored within the FIFO memory and control circuit 104. The processing performed in the programmable element 106 is preferably a parallel process in relation to the FIFO data input 152 and the FIFO data output 162. The nature of the FIFO operation provides the synchronization function necessary for this parallel processing.

The execution unit 158 and the program memory 156 are both coupled to the control access unit 154. The control access unit 154 controls the operation of both the execution unit 158 and the program memory 156. As discussed above, the programmable element 106 is programmed by an application or control circuit through the control access interface. The execution unit 158 is also coupled to a FIFO data output 162 and to an external input/output interface 160. The external input/output interface 160 is coupled to transmit event signals to applications or control circuits external to the programmable FIFO 52. The FIFO data output 162 is coupled to the input of the multiplexer 108 to transmit data to be output by the multiplexer 108, as appropriate.

As described above, the normal operation of a FIFO is to maintain the order of the data and provide a buffering function, such that the data is output in the same order that it was received. In the programmable FIFO 52 of the present invention, the programmable element 106 is included. The inclusion of the programmable element 106 within the programmable FIFO 52 adds the capability to perform a programmable set of instructions or commands on the data as it passes through the programmable FIFO 52. The instructions and commands are defined for the format of the data passing through the programmable FIFO 52. The programmable FIFO 52 of the present invention operates as a typical FIFO and buffers the data, without manipulation of the data, if no manipulation or synchronization program instructions are stored within the program memory 156 of the programmable FIFO 52. However, the programmable element 106, when programmed to manipulate or perform instructions related to the stream of data passing through the programmable FIFO 52, allows the programmable FIFO 52 to manipulate or otherwise adapt the data, as programmed, as the stream of data passes through the programmable FIFO 52 and/or synchronize the output of the stream of data to a time reference. As an example, the availability of the FIFO output can be synchronized with an external time reference by having the processing element examine a format dependent field contained within the data passing through the programmable FIFO 52. Utilizing the address bus and the data bus, the data stored within the FIFO memory and control circuit 104 can be addressably accessed and processed according to the programmed instructions. This processing can also include re-ordering the data within the FIFO memory and control circuit 104 before it is output.

The instructions and commands to be performed on the data within the FIFO 52 are provided from an external application or control circuit and preferably stored within the program memory 156 in the programmable element 106. Alternatively, the instructions and commands are stored within an accompanying read-only memory. The event signals are used to synchronize the operation of the programmable element 106 with external time bases or other events. The programmable element 106 is preferably a RISC-like processor for general purpose use. Alternatively, the programmable element 106 is a programmable sequencer or a state machine with appropriate input and output support. The instruction set stored within the program memory 156 and executed by the execution unit 158 reflects the kind of processing tasks for which the processing element is needed based on the type of data passing through the programmable FIFO 52.

The programmable FIFO 52 of the present invention can be used to perform programs that require examining data in the stream stored in the programmable FIFO 52. As an example of the operation of the programmable FIFO 52, the output of the programmable FIFO 52 can be synchronized with external events or time. Within an IEEE 1394-2000 serial bus packet of data, the data includes a header describing the synchronization criteria, such as time referenced to the local time base. In this example, this header can be part of the data within the stream or may be an application specific format that is removed before the data is output from the FIFO. The time base to which the output is to be synchronized can be local to the environment but in need of synchronization with a global time base, such as the cycle time of the IEEE 1394-2000 serial bus.

Figure 7:
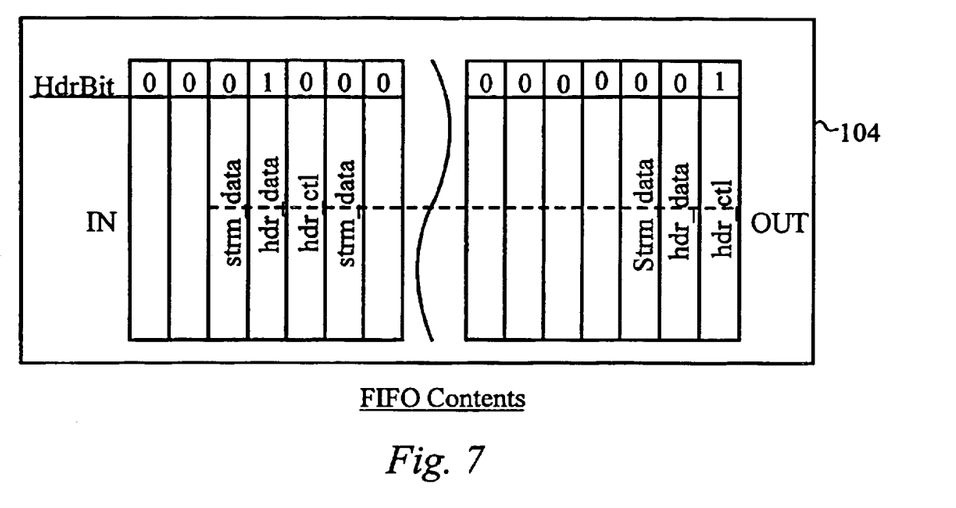
FIG. 7 illustrates an exemplary stream of data stored within the FIFO memory and control circuit of the programmable FIFO.

An exemplary stream of data stored within the FIFO memory and control circuit 104 is illustrated in FIG. 7. The FIFO contents illustrated in FIG. 7 are an example of using an embedded header control structure to provide synchronization information to the program executed by the processing element. In this example, the program instructions to synchronize the contents of the FIFO to a time base, are programmed into the program memory 156 by an application or control circuit, as described above. The execution unit 158 then executes the program instructions on the contents of the FIFO memory and control circuit 104. In this exemplary process, the contents of the header are stripped from the FIFO before the data field contents are provided from the output interface 10 of the FIFO. The contents of the header include the information needed by the execution unit 158 to implement proper synchronization of the local time base and the global time base, as well as allowing the data field contents to be correctly modified. Accordingly, by using the separated header bit, the execution unit 158 has the ability to then synchronize the output of the data field contents through the output interface 110 onto the IEEE 1394-2000 serial bus.

Another exemplary use of the programmable FIFO 52 of the present invention involves examining the stream of data received at the input interface 100 and filtering out unwanted portions of the stream of data. This approach is used to implement a form of trick play, such as fast-forward or rewind, when the received stream of data is from a recorded stream of data.

As described above, the programmable FIFO 52 of the present invention has the ability to be programmed by an external application or control circuit to execute a series of program instructions and perform a series of operations on a stream of data being buffered within the programmable FIFO 52. The stream of data can be any type of data including isochronous or asynchronous data. The series of program instructions are stored within the program memory 156 and executed by the execution unit 158. Both the program memory 156 and the execution unit 158 are preferably implemented within the programmable element 106 within the programmable FIFO 52. The stream of data is preferably stored within the FIFO memory and control circuit. 104 within the programmable FIFO 52.

Adding this programmability and intelligence to the programmable FIFO 52 provides a mechanism allowing concurrent processing and synchronization of the stream of data being buffered within the programmable FIFO 52. The programmable FIFO 52 has the ability to filter the stream of data as it passes through the FIFO and also to synchronize the stream of data with external and output signals.

The present invention has been described in terms of specific embodiments incorporating details to facilitate the understanding of principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention. Specifically, it will be apparent to those skilled in the art that while the preferred embodiment of the present invention is used within an IEEE 1394-2000 serial bus structure, the present invention could also be implemented on any other appropriate bus structures.

I claim:

1. A method of buffering data within a first-in first-out buffer comprising:
   a. receiving a stream of data to be buffered within the first-in first-out buffers
   b. storing the stream of data within the first-in first-out buffer thereby forming a stored stream of data;
   c. obtaining a series of program instructions at the first-in first-out buffer specifying operation to be performed on the stored stream of data; and
   d. generating an output stream of data by executing the series of program instructions and performing the operations to manipulate the stored stream of data while within the first-in first-out buffer.

2. The method as claimed in claim 1 wherein the program instructions are obtained from an application.

3. The method as claimed in claim 1 wherein the program instructions are obtained from a control circuit.

4. The method as claimed in claim 1 wherein the stream of data is received from a bus structure.

5. The method as claimed in claim 4 wherein the bus structure is an IEEE 1394 bus structure.

6. The method as claimed in claim 1 further comprising transmitting the output stream of data from a buffer interface.

7. The method as claimed in claim 1 wherein generating an output stream includes synchronizing the output stream of data to a time reference.

8. The method as claimed in claim 7 wherein the time reference is a cycle time of an IEEE 1394 bus structure.

9. A method of buffering data within a first-in first-out buffer comprising:
   a receiving a stream of data to be buffered within the first-in first-out buffer;
   b. storing the stream of data within the first-in first-out buffer thereby forming a stored stream of data;
   c. obtaining a series of program instructions at the first-in first-out buffer specifying operations to be performed in relation to the stored stream of data; and
   d. generating an output stream of data by executing the series of program instructions and performing the operations to manipulate the stored stream of data while within the first-in first-out buffer, including synchronizing the output stream of data to a time reference.

10. The method as claimed in claim 9 wherein the program instructions are obtained from an application.

11. The method as claimed in claim 9 wherein the program instructions are obtained from a control circuit.

12. The method as claimed in claim 9 wherein the stream of data is received from a bus structure.

13. The method as claimed in claim 12 wherein the bus structure is an IEEE 1394 bus structure.

14. The method as claimed in claim 9 further comprising transmitting the output stream of data from a buffer interface.

15. The method as claimed in claim 9 wherein generating an output stream of data includes manipulating the stored stream of data to form the output stream of data.

16. The method as claimed in claim 9 wherein the time reference is a cycle time of an IEEE 1394 bus structure.

17. An apparatus for buffering data within a first-in first-out buffer comprising:
   a. means for a receiving a stream of data to be buffered within the first-in first-out buffer;
   b. means for storing the stream of data within the first-in first-out buffer thereby forming a stored stream of data;

c. means for obtaining a series of program instructions specifying operations to be performed on the stored stream of data; and d. means for generating an output stream of data by executing the series of program instructions and performing the operations to manipulate the stored stream of data while within the first-in first-out buffer.

18. The apparatus as claimed in claim 17 wherein the program instructions are obtained from an application.

19. The apparatus as claimed in claim 17 wherein the program instructions are obtained from a control circuit.

20. The apparatus as claimed in claim 17 wherein the means for receiving a stream of data is coupled to a bus structure to receive the stream of data.

21. The apparatus as claimed in claim 20 wherein the bus structure is an IEEE 1394 bus structure.

22. The apparatus as claimed in claim 17 further comprising means for transmitting coupled to the means for generating for transmitting the output stream of data.

23. The apparatus as claimed in claim 17 wherein the means for generating synchronizes the output stream of data to a time reference.

24. The apparatus as claimed in claim 23 wherein the time reference is a cycle time of an IEEE 1394 bus structure.

25. A programmable first-in first-out buffer comprising:

a. an input interface circuit configured to receive a stream of data to be buffered within the first-in first-out buffer;

b. a data memory coupled to the input interface circuit to store the stream of data, thereby forming a stored stream of data;

c. a program memory configured to obtain and store a series of program instructions specifying operations to be performed on the stored stream of data; and d. an execution unit coupled to the program memory and to the data memory to generate an output stream of data by executing the series of program instructions and perform the operations on the stored stream of data while the stored stream of data is within the data memory of the first-in first-out buffer.

26. The programmable first-in first-out buffer as claimed in claim 25 wherein the program instructions are obtained from an application.

27. The programmable first-in first-out buffer as claimed in claim 25 wherein the program instructions are obtained from a control circuit.

28. The programmable first-in first-out buffer as claimed in claim 25 wherein the input interface circuit is coupled to a bus structure to receive the stream of data.

29. The programmable first-in first-out buffer as claimed in claim 28 wherein the bus structure is an IEEE 1394 bus structure.

30. The programmable first-in first-out buffer as claimed in claim 25 further comprising an output interface circuit coupled to the execution circuit and the data memory and configured to transmit the output stream of data.

31. The programmable first-in first-out buffer as claimed in claim 25 wherein the execution unit synchronizes the output stream of data to a time reference.

32. The programmable first-in first-out buffer as claimed in claim 31 wherein the time reference is a cycle time of an IEEE 1394 bus structure.

33. A system comprising:

a. a bus interface circuit configured to couple to a bus structure and receive a stream of data;

b. a data memory coupled to the bus interface circuit to store the stream of data, thereby forming a stored stream of data, wherein the data memory stores and outputs the stored stream of data, thereby forming an output stream of data;

c. a program memory configured to obtain and store a series of program instructions specifying operations to be performed on the stored stream of data; and d. an execution unit coupled to the program memory and to the data memory to generate the output stream of data by executing the series of program instructions and performing the operations on the stored stream of data while the stored stream of data is within the data memory.

34. The system as claimed in claim 33 wherein the program instructions are obtained from an application.

35. The system as claimed in claim 33 wherein the program instructions are obtained from a control circuit.

36. The system as claimed in claim 33 wherein the bus structure is an IEEE 1394 bus structure.

37. The system as claimed in claim 33 further comprising an output interface circuit coupled to the execution unit and the data memory and configured to transmit the output stream of data.

38. The system as claimed in claim 33 wherein the execution unit synchronizes the output stream of data to a time reference.

39. The system as claimed in claim 38 wherein the time reference is a cycle time of an IEEE 1394 bus structure.

40. A network of devices comprising:

a. a plurality of devices;

b. a bus structure coupled between the plurality of devices to transmit data between the devices; and c. a programmable first-in first-out buffer including:

i. an input interface circuit configured to receive a stream of data to be buffered within the first-in first-out buffer;

ii. a data memory coupled to the input interface circuit to store the stream of data, thereby forming a stored stream of data;

iii. a program memory configured to obtain and store a series of program instructions specifying operations to be performed on the stored stream of data; and iv. an execution unit coupled to the program memory and to the data memory to generate an output stream of data by executing the series of program instructions and perform the operations on the stored stream of data while the stored stream of data is within the data memory of the first-in first-out buffer.

41. The network of devices as claimed in claim 40 wherein the program instructions are obtained from an application.

42. The network of devices as claimed in claim 40 wherein the program instructions are obtained from a control circuit.

43. The network of devices as claimed in claim 40 wherein the bus structure is an IEEE 1394 bus structure.

44. The network of devices as claimed in claim 40 further comprising an output interface circuit coupled to the execution unit and the data memory and configured to transmit the output stream of data.

45. The network of devices as claimed in claim 40 wherein the execution unit synchronizes the output stream of data to a time reference.

46. The network of devices as claimed in claim 45 wherein the time reference is a cycle time of an IEEE 1394 bus structure.

* * * * *

UNITED STATES PATENT AND TRADEMARK OFFICE
CERTIFICATE OF CORRECTION

PATENT NO. : 6,904,475 B1 Page 1 of 1
DATED : June 7, 2005
INVENTOR(S) : Bruce A. Fairman

It is certified that error appears in the above-identified patent and that said Letters Patent is hereby corrected as shown below:

Column 2,
Line 27, replace "FEFO's are generally" with -- FIFO's are generally --.

Column 6,
Line 13, replace "video amplifier SO" with -- video amplifier 50 --.

Signed and Sealed this

Sixth Day of September, 2005

JON W. DUDAS
*Director of the United States Patent and Trademark Office*